(12) United States Patent
Miyazaki et al.

(10) Patent No.: US 11,898,328 B2
(45) Date of Patent: Feb. 13, 2024

(54) WORK VEHICLE AND CONTROL METHOD FOR WORK VEHICLE

(71) Applicant: Komatsu Ltd., Tokyo (JP)

(72) Inventors: Shogo Miyazaki, Tokyo (JP); Akira Takeno, Tokyo (JP)

(73) Assignee: Komatsu Ltd., Tokyo (JP)

( * ) Notice: Subject to any disclaimer, the term of this patent is extended or adjusted under 35 U.S.C. 154(b) by 156 days.

(21) Appl. No.: 17/617,081

(22) PCT Filed: Jun. 12, 2020

(86) PCT No.: PCT/JP2020/023273
§ 371 (c)(1),
(2) Date: Dec. 7, 2021

(87) PCT Pub. No.: WO2020/255892
PCT Pub. Date: Dec. 24, 2020

(65) Prior Publication Data
US 2022/0235536 A1 Jul. 28, 2022

(30) Foreign Application Priority Data
Jun. 19, 2019 (JP) .................. 2019-114082

(51) Int. Cl.
*F16H 47/04* (2006.01)
*E02F 9/22* (2006.01)

(52) U.S. Cl.
CPC .......... *E02F 9/2253* (2013.01); *E02F 9/2235* (2013.01); *E02F 9/2292* (2013.01); *F16H 47/04* (2013.01)

(58) Field of Classification Search
CPC ............. F16H 47/04; F16H 2059/6853; F16H 61/462; E02F 9/2253; E02F 9/2235; E02F 9/2292
See application file for complete search history.

(56) References Cited

U.S. PATENT DOCUMENTS 2,657,783 A 11/1953 Woodson
2,939,342 A 6/1960 Woydt et al.
(Continued)

FOREIGN PATENT DOCUMENTS

GB 704283 A 2/1954
JP H02-010302 B2 3/1990
(Continued)

OTHER PUBLICATIONS

Supplementary European Search Report dated Dec. 12, 2022, issued for European Patent Application No. 20825772.5.
(Continued)

*Primary Examiner* — Edwin A Young
(74) *Attorney, Agent, or Firm* — Locke Lord LLP

(57) ABSTRACT

A control method for a work vehicle, includes: calculating a speed ratio indicating a ratio between a rotation speed of an input shaft connected to an engine and a rotation speed of an output shaft connected to a traveling device; and outputting a capacity command for changing at least one of a capacity of a first hydraulic pump motor and a capacity of a second hydraulic pump motor based on correlation data indicating a relationship between the speed ratio and the capacities of the first and second hydraulic pump motors, wherein the correlation data is set so that both the capacity of the first hydraulic pump motor and the capacity of the second hydraulic pump motor are changed with a change in the speed ratio in a predetermined speed ratio range between a first speed ratio and a second speed ratio higher than the first speed ratio.

9 Claims, 8 Drawing Sheets

(56) References Cited

U.S. PATENT DOCUMENTS

| | | | |
|---|---|---|---|
| 3,204,486 A | | 9/1965 | Lalio |
| 4,495,768 A | * | 1/1985 | Valavaara ............... F16D 31/06 |
| | | | 74/606 R |
| 4,983,149 A | | 1/1991 | Kita |
| 7,296,496 B2 | | 11/2007 | Shah |
| 7,972,236 B2 | | 7/2011 | Hiraki et al. |
| 2011/0301793 A1 | * | 12/2011 | Hsieh ............... F16H 61/66272 |
| | | | 903/902 |
| 2014/0305113 A1 | | 10/2014 | Salaris et al. |
| 2016/0153174 A1 | | 6/2016 | Naito |
| 2016/0160470 A1 | * | 6/2016 | Kishimoto ............ B60K 6/365 |
| | | | 903/910 |

FOREIGN PATENT DOCUMENTS

| | | |
|---|---|---|
| JP | H05-280616 A | 10/1993 |
| JP | 2006-194444 A | 7/2006 |
| JP | 2006-329244 A | 12/2006 |
| JP | 2009-36299 A | 2/2009 |
| JP | 2009-138819 A | 6/2009 |
| JP | 2010-203596 A | 9/2010 |
| JP | 2014-206271 A | 10/2014 |

OTHER PUBLICATIONS

Office Action dated Jun. 6, 2022, issued in the corresponding Chinese patent application No. 202080032331.7 and English translation thereof.

Decision to Grant dated Aug. 1, 2023, issued for the corresponding Japanese patent application No. 2019-114082 and English translation thereof.

* cited by examiner

WORK VEHICLE AND CONTROL METHOD FOR WORK VEHICLE

FIELD

The present invention relates to a work vehicle and a control method for the work vehicle.

BACKGROUND

In a technical field related to a work vehicle, a hydraulic static transmission (HST) in which a hydraulic pump and a hydraulic motor are combined is known. In addition, a hydraulic mechanical transmission (HMT) in which the HST and a planetary gear mechanism are combined is known.

The HST is a purely hydraulic transmission that converts all power generated by an engine into a hydraulic pressure and transmits the hydraulic pressure. The HMT is a power split transmission that mechanically transmits a part of power generated by the engine, and converts a part of the power generated by the engine into a hydraulic pressure and then transmits the hydraulic pressure. In the HMT, a part of power is converted into a hydraulic pressure, and thus, power transmission efficiency is high. Therefore, the HMT is used in a work vehicle having a large load variation, such as a wheel loader or a bulldozer.

A continuously variable transmission function of the HMT is achieved by the planetary gear mechanism. Among three elements of the planetary gear mechanism including a sun gear, a carrier supporting a planetary gear, and a ring gear, a first element is connected to an input shaft, a second element is connected to an output shaft, and a third element is connected to the hydraulic pump or the hydraulic motor.

A power transmission device including the HMT capable of performing switching between a plurality of modes for a power transmission path is known. The power transmission device transmits power input from the engine to the input shaft to the output shaft connected to a traveling device of the work vehicle via a clutch mechanism. The power transmission device capable of performing switching between the plurality of modes for the power transmission path can achieve a wide range of speed ratio with a small-capacity hydraulic pump or hydraulic motor. Examples of the plurality of modes include a high-speed mode in which a traveling speed of the work vehicle is high and a low-speed mode in which the traveling speed of the work vehicle is low. For example, the mode switching is performed based on the speed ratio of the power transmission device. The speed ratio of the power transmission device refers to a ratio between a rotation speed of the input shaft and a rotation speed of the output shaft. The high-speed mode is selected when the speed ratio is greater than a predetermined threshold. The low-speed mode is selected when the speed ratio is equal to or less than the predetermined threshold.

In the power transmission device capable of performing switching between the plurality of modes for the power transmission path, the mode switching is performed by performing switching between a plurality of clutches provided in a clutch mechanism. Examples of the plurality of clutches include a high-speed clutch engaged in the high-speed mode and a low-speed clutch engaged in the low-speed mode. In the high-speed mode, the high-speed clutch is engaged and the low-speed clutch is released. In the low-speed mode, the low-speed clutch is engaged and the high-speed clutch is released.

CITATION LIST

Patent Literature

Patent Literature 1: JP 2006-329244 A

SUMMARY

Technical Problem

In a power transmission device including an HMT, a first hydraulic pump motor that functions as one of a hydraulic pump and a hydraulic motor and a second hydraulic pump motor that functions as the other of the hydraulic pump and the hydraulic motor are provided. For example, a capacity ratio between the first hydraulic pump motor and the second hydraulic pump motor is determined based on a speed ratio of the power transmission device, and it is necessary to change capacities of the first hydraulic pump motor and the second hydraulic pump motor so that the capacity ratio can be achieved. In a case where responsiveness in a change of the capacity ratio between the first hydraulic pump motor and the second hydraulic pump motor is insufficient, for example, when a rotation speed of an output shaft is rapidly changed, there is a possibility that a target speed ratio cannot be achieved and an engine speed cannot be maintained in an appropriate range. For example, in a case where a work vehicle hits a natural ground during traveling and a traveling speed of the work vehicle thus is rapidly decreased, the rotation speed of the output shaft is rapidly decreased. In a case where the rotation speed of the output shaft is rapidly decreased, the capacity ratio between the pump motors and the speed ratio cannot be sufficiently changed due to the insufficient responsiveness of the hydraulic pump motor, and a rotation speed of an input shaft is also rapidly decreased. As a result, the engine speed may be decreased, or an engine stall, which is a phenomenon in which the engine suddenly stops, may occur.

The capacity of the hydraulic pump motor is changed as a swash plate or an inclined shaft of the hydraulic pump motor is driven. For example, in a case where a command for driving the swash plate or the inclined shaft of the pump motor is more promptly executed in order to improve the responsiveness of the capacity ratio between the pump motors, there is a possibility that stability is impaired and the capacity is excessively changed. Furthermore, in a case where a drive command is issued to change the capacity in a state where the swash plate or the inclined shaft of the hydraulic pump motor is fixed at a certain capacity, a time lag occurs until the capacity is actually changed, which also becomes an obstructive factor in achieving the target capacity ratio between the pump motors. As a result, the capacity ratio between the pump motors and the speed ratio cannot be smoothly changed, which may lead to sensory deterioration such as a jerky feeling.

An object of an aspect of the present invention is to suppress sensory deterioration while appropriately maintaining a speed ratio by making a change of a swash plate or an inclined shaft of a pump motor as gentle as possible and reducing a time lag occurrence frequency when the swash plate or the inclined shaft starts to move as much as possible while changing a capacity ratio between pump motors with high responsiveness.

Solution to Problem

According to an aspect of the present invention, a work vehicle comprises: an input shaft that is connected to an engine; an output shaft that is connected to a traveling device; a power transmission device that includes a hydraulic transmission mechanism including a first hydraulic pump motor and a second hydraulic pump motor and transmitting power input to the input shaft to the output shaft via a clutch mechanism, the first hydraulic pump motor functioning as one of a hydraulic pump and a hydraulic motor and the second hydraulic pump motor functioning as the other of the hydraulic pump and the hydraulic motor; and a control device, wherein the control device includes: a clutch control unit that outputs a clutch command for engaging a specified clutch among a plurality of clutches of the clutch mechanism based on a speed ratio indicating a ratio between a rotation speed of the input shaft and a rotation speed of the output shaft; a storage unit that stores correlation data indicating a relationship between the speed ratio and a capacity of the first hydraulic pump motor and a capacity of the second hydraulic pump motor; and a power control unit that outputs a capacity command for changing at least one of the capacity of the first hydraulic pump motor and the capacity of the second hydraulic pump motor based on the speed ratio and the correlation data, and the correlation data is set so that both the capacity of the first hydraulic pump motor and the capacity of the second hydraulic pump motor are changed with a change in the speed ratio in a predetermined speed ratio range between a first speed ratio and a second speed ratio higher than the first speed ratio.

Advantageous Effects of Invention

According to an aspect of the present invention, it is possible to suppress sensory deterioration while appropriately maintaining a speed ratio by making a change of a swash plate or an inclined shaft of the pump motor as gentle as possible and reducing a time lag occurrence frequency when the swash plate or the inclined shaft starts to move as much as possible while changing a capacity ratio between the pump motors with high responsiveness.

DESCRIPTION OF EMBODIMENTS

Hereinafter, embodiments according to the present invention will be described with reference to the drawings, but the present invention is not limited thereto. Components of the embodiments to be described below can be combined as appropriate. In addition, some components are not used in some cases.

[Work Vehicle]

Figure 1:
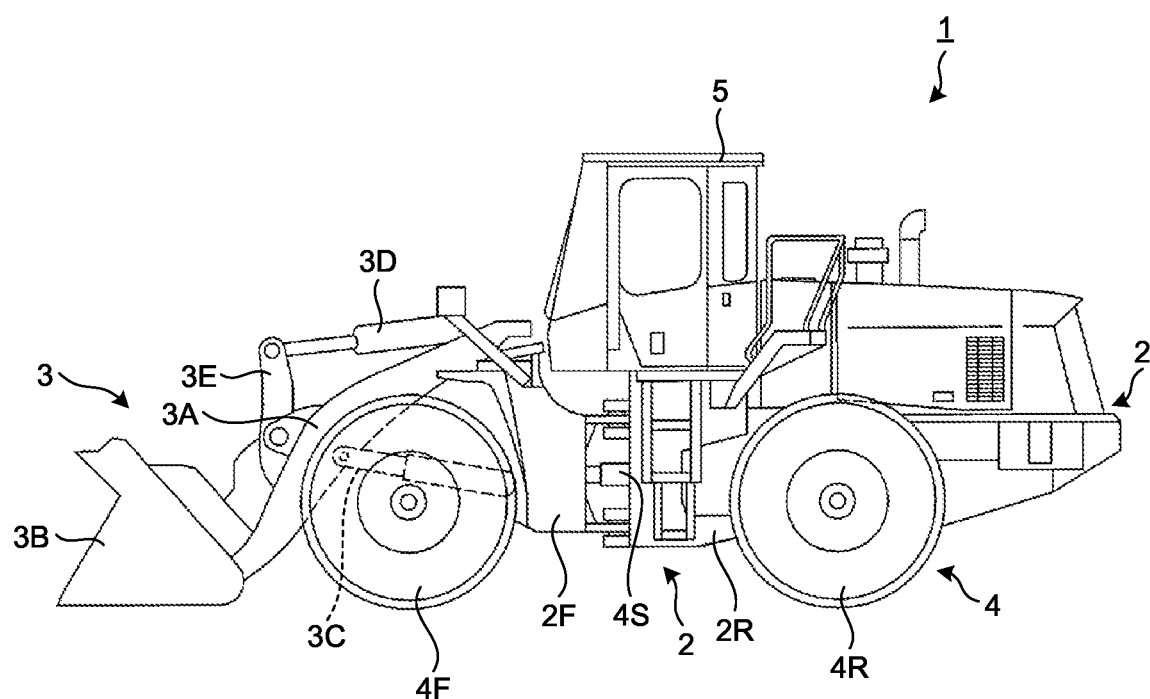
FIG. 1 is a side view schematically illustrating an example of a work vehicle according to the present embodiment.

FIG. 1 is a side view schematically illustrating an example of a work vehicle 1 according to the present embodiment. In the present embodiment, the work vehicle 1 is assumed to be a wheel loader. In the following description, the work vehicle 1 is appropriately referred to as a wheel loader 1.

As illustrated in FIG. 1, the wheel loader 1 includes a vehicle body frame 2, working equipment 3, a traveling device 4, and a cab 5. The wheel loader 1 performs excavation work and transportation work by using the working equipment 3.

The vehicle body frame 2 functions as a body of the wheel loader 1. The vehicle body frame 2 includes a front frame 2F and a rear frame 2R. The front frame 2F and the rear frame 2R are connected so as to be bendable in a left-right direction.

The working equipment 3 performs predetermined work such as the excavation work and the transportation work. The working equipment 3 includes a boom 3A and a bucket 3B. The boom 3A is supported by the front frame 2F. The working equipment 3 is driven by a lift cylinder 3C and a bucket cylinder 3D. Each of the lift cylinder 3C and the bucket cylinder 3D is a hydraulic cylinder. One end portion of the lift cylinder 3C is connected to the front frame 2F. The other end portion of the lift cylinder 3C is connected to the boom 3A. As the lift cylinder 3C extends and retracts, the boom 3A makes upward movement and downward movement. The bucket 3B is connected to a distal end portion of the boom 3A. One end portion of the bucket cylinder 3D is connected to the front frame 2F. The other end portion of the bucket cylinder 3D is connected to the bucket 3B via a bell crank 3E. As the bucket cylinder 3D extends and retracts, the bucket 3B makes dumping movement and excavation movement.

The traveling device 4 travels while supporting the vehicle body frame 2. The traveling device 4 includes traveling wheels 4F and traveling wheels 4R. The wheel loader 1 travels as the traveling wheels 4F and 4R rotate. A traveling direction of the wheel loader 1 is changed by a steering cylinder 4S. The steering cylinder 4S is a hydraulic cylinder. One end portion of the steering cylinder 4S is connected to the front frame 2F. The other end portion of the steering cylinder 4S is connected to the rear frame 2R. As the steering cylinder 4S extends and retracts, the front frame 2F and the rear frame 2R are bent, and the traveling direction of the wheel loader 1 is changed to the left and right.

The cab 5 is a space on which a driver of the wheel loader 1 boards. The cab 5 is supported by the vehicle body frame 2. A seat on which the driver of the wheel loader 1 sits and an operation device operated by the driver are disposed in the cab 5.

Figure 2:
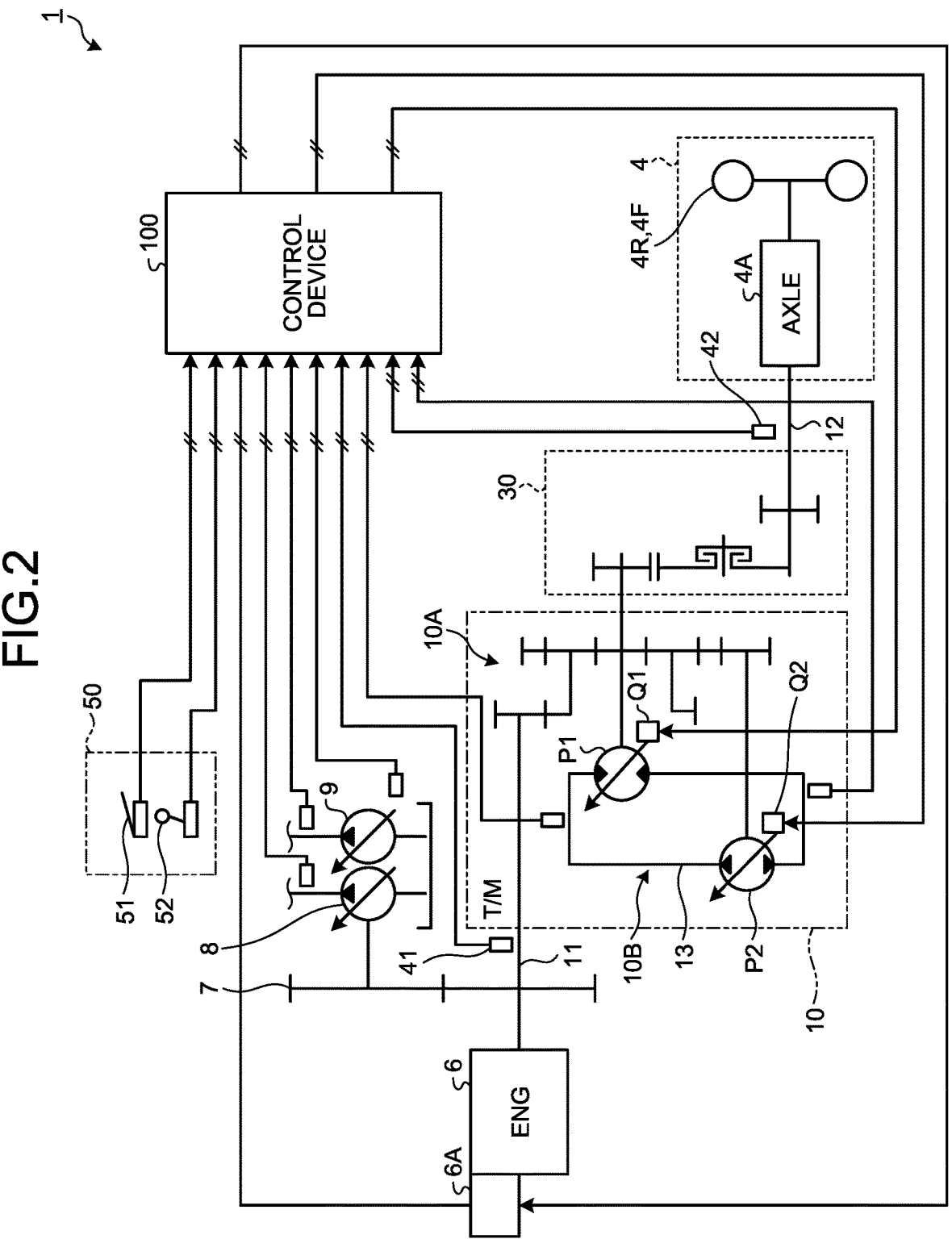
FIG. 2 is a block diagram illustrating an example of the work vehicle according to the present embodiment.

FIG. 2 is a block diagram illustrating an example of the wheel loader 1 according to the present embodiment. As illustrated in FIG. 2, the wheel loader 1 includes an engine 6, a power take-off (PTO) 7, a working equipment pump 8, a steering pump 9, an input shaft 11, an output shaft 12, a power transmission device 10, a clutch mechanism 30, the traveling device 4, an operation device 50, and a control device 100.

The engine 6 is a power source of the wheel loader 1. The engine 6 generates power. The engine 6 is, for example, a diesel engine. The engine 6 is provided with a fuel injection device 6A. The fuel injection device 6A adjusts the amount of fuel injected into a cylinder of the engine 6 to adjust an output of the engine 6.

The power take-off 7 distributes the power generated by the engine 6 to each of the working equipment pump 8, the steering pump 9, and the power transmission device 10.

The working equipment pump 8 supplies hydraulic oil to each of the lift cylinder 3C and the bucket cylinder 3D. The working equipment pump 8 is driven by the engine 6. The working equipment pump 8 is a variable displacement hydraulic pump. The hydraulic oil discharged from the working equipment pump 8 is supplied to each of the lift cylinder 3C and the bucket cylinder 3D via a working equipment control valve.

The steering pump 9 supplies hydraulic oil to the steering cylinder 4S. The steering pump 9 is driven by the engine 6. The steering pump 9 is a variable displacement hydraulic pump. The hydraulic oil discharged from the steering pump 9 is supplied to the steering cylinder 4S via a steering control valve. Note that a pump (not illustrated) for driving auxiliary equipment such as a cooling fan or driving a clutch may be connected to the power take-off 7.

The input shaft 11 is connected to the engine 6. The output shaft 12 is connected to the traveling device 4. The input shaft 11 receives power from the engine 6. The power transmission device 10 transmits the power input to the input shaft 11 to the output shaft 12. The output shaft 12 outputs power to the traveling device 4. The power generated by the engine 6 is transmitted to the traveling device 4 via the power transmission device 10.

The power transmission device 10 includes a hydraulic mechanical transmission (HMT). The power transmission device 10 includes a mechanical transmission mechanism 10A that includes a planetary gear mechanism and mechanically transmits a part of the power input to the input shaft 11 to the output shaft 12, and a hydraulic transmission mechanism 10B that includes a first hydraulic pump motor P1 and a second hydraulic pump motor P2, converts a part of the power input to the input shaft 11 into a hydraulic pressure, and transmits the hydraulic pressure to the output shaft 12. The power transmission device 10 is a power split transmission that mechanically transmits a part of the power generated by the engine 6 to the output shaft 12 via the mechanical transmission mechanism 10A, and converts a part of the power generated by the engine 6 into a hydraulic pressure in the hydraulic transmission mechanism 10B to transmit the hydraulic pressure to the output shaft 12.

The first hydraulic pump motor P1 and the second hydraulic pump motor P2 are connected via a hydraulic oil pipe 13. The first hydraulic pump motor P1 functions as one of a hydraulic pump and a hydraulic motor. The second hydraulic pump motor P2 functions as the other of the hydraulic pump and the hydraulic motor.

In a case where the first hydraulic pump motor P1 functions as the hydraulic pump, the second hydraulic pump motor P2 functions as the hydraulic motor. Hydraulic oil discharged from the first hydraulic pump motor P1 is supplied to the second hydraulic pump motor P2 via the hydraulic oil pipe 13. The second hydraulic pump motor P2 is driven based on the hydraulic oil supplied from the first hydraulic pump motor P1.

In a case where the second hydraulic pump motor P2 functions as the hydraulic pump, the first hydraulic pump motor P1 functions as the hydraulic motor. Hydraulic oil discharged from the second hydraulic pump motor P2 is supplied to the first hydraulic pump motor P1 via the hydraulic oil pipe 13. The first hydraulic pump motor P1 is driven based on the hydraulic oil supplied from the second hydraulic pump motor P2.

Each of the first hydraulic pump motor P1 and the second hydraulic pump motor P2 is a variable displacement hydraulic pump motor. The power transmission device 10 includes a first capacity adjustment device Q1 that adjusts a capacity Pc1 of the first hydraulic pump motor P1 and a second capacity adjustment device Q2 that adjusts a capacity Pc2 of the second hydraulic pump motor P2. The first capacity adjustment device Q1 includes an actuator that drives an inclined shaft of the first hydraulic pump motor P1, and adjusts the capacity Pc1 of the first hydraulic pump motor P1 by driving the inclined shaft of the first hydraulic pump motor P1. The second capacity adjustment device Q2 includes an actuator that drives an inclined shaft of the second hydraulic pump motor P2, and adjusts the capacity Pc2 of the second hydraulic pump motor P2 by driving the inclined shaft of the second hydraulic pump motor P2.

Note that, in the present embodiment, each of the first hydraulic pump motor P1 and the second hydraulic pump motor P2 is a bent-axis hydraulic pump motor whose capacity is adjusted as the inclined shaft is driven, but at least one of the first hydraulic pump motor P1 or the second hydraulic pump motor P2 may be a swash plate hydraulic pump motor whose capacity is adjusted as a swash plate is driven.

The clutch mechanism 30 transmits and interrupts power from the power transmission device 10. The clutch mechanism 30 selects output rotation. The clutch mechanism 30 includes a plurality of clutches. The clutch mechanism 30 may include a gear. The clutch mechanism 30 may switch a reduction gear ratio and a rotation direction. Although the clutch mechanism 30 selects the output rotation in FIG. 2, but the clutch mechanism 30 may select input rotation of the power transmission device 10.

The traveling device 4 includes an axle 4A, the traveling wheels 4F, and the traveling wheels 4R. The axle 4A transmits power from the power transmission device 10 to each of the traveling wheels 4F and the traveling wheels 4R. The traveling wheels 4F and the traveling wheels 4R rotate by the power transmitted from the axle 4A.

The operation device 50 is operated by the driver in the cab 5. The operation device 50 includes an accelerator/brake operation device 51 operated for driving and braking the traveling device 4, and a forward-reverse operation device 52 operated to change the state of the traveling device 4 between a forward state, a neutral state, and a reverse state.

The forward-reverse operation device 52 includes a forward-reverse operation member. The forward-reverse operation member is movable to each of a forward position (F position) for bringing the traveling device 4 into the forward state, a neutral position (N position) for bringing the traveling device 4 into the neutral state, and a reverse position (R position) for bringing the traveling device 4 into the reverse state. The N position is disposed between the F position and the R position. An operation for switching between the F position and the R position is performed via the N position.

When the forward-reverse operation member is moved to the F position, the traveling device 4 can move forward. When the forward-reverse operation member is moved to the N position, the traveling device 4 is brought into the neutral state. When the forward-reverse operation member is moved to the R position, the traveling device 4 can be reversed.

In a case of changing the state of the traveling device 4 from the forward state to the reverse state, the driver moves the forward-reverse operation member from the F position to the R position. In a case of changing the state of the traveling device 4 from the reverse state to the forward state, the driver moves the forward-reverse operation member from the R position to the F position. The forward-reverse operation member is moved from the F position to the R position via the N position. The forward-reverse operation member is moved from the R position to the F position via the N position. That is, in a case of changing the state of the traveling device 4 between the forward state and the reverse state, the forward-reverse operation member is moved from one of the F position and the R position to the other via the N position.

Note that, although not illustrated, the operation device 50 further includes a working equipment operation device operated for operating the working equipment 3 and a steering operation device operated for changing the traveling direction of the wheel loader 1.

The control device 100 includes a computer system that controls the wheel loader 1. The control device 100 controls the fuel injection device 6A to adjust the output of the engine 6. The control device 100 controls the first capacity adjustment device Q1 to adjust the capacity of the first hydraulic pump motor P1. The control device 100 controls the second capacity adjustment device Q2 to adjust the capacity of the second hydraulic pump motor P2.

Further, the wheel loader 1 also includes an input shaft rotation speed sensor 41 and an output shaft rotation speed sensor 42.

The input shaft rotation speed sensor 41 detects the rotation speed of the input shaft 11 per unit time. The rotating speed of the input shaft 11 is detected by detecting the rotation speed of the input shaft 11. A detection signal of the input shaft rotation speed sensor 41 is output to the control device 100. The rotation speed of the input shaft 11 corresponds to an engine speed of the engine 6 on a one-to-one basis. The control device 100 can calculate the engine speed of the engine 6 based on the rotation speed of the input shaft 11.

The output shaft rotation speed sensor 42 detects the rotation speed of the output shaft 12 per unit time. The rotating speed of the output shaft 12 is detected by detecting the rotation speed of the output shaft 12. A detection signal of the output shaft rotation speed sensor 42 is output to the control device 100. The rotation speed of the output shaft 12 and a traveling speed of the wheel loader 1 correspond to each other on a one-to-one basis. The control device 100 can calculate the traveling speed of the wheel loader 1 based on the rotation speed of the output shaft 12.

[Power Transmission Device]

Figure 3:
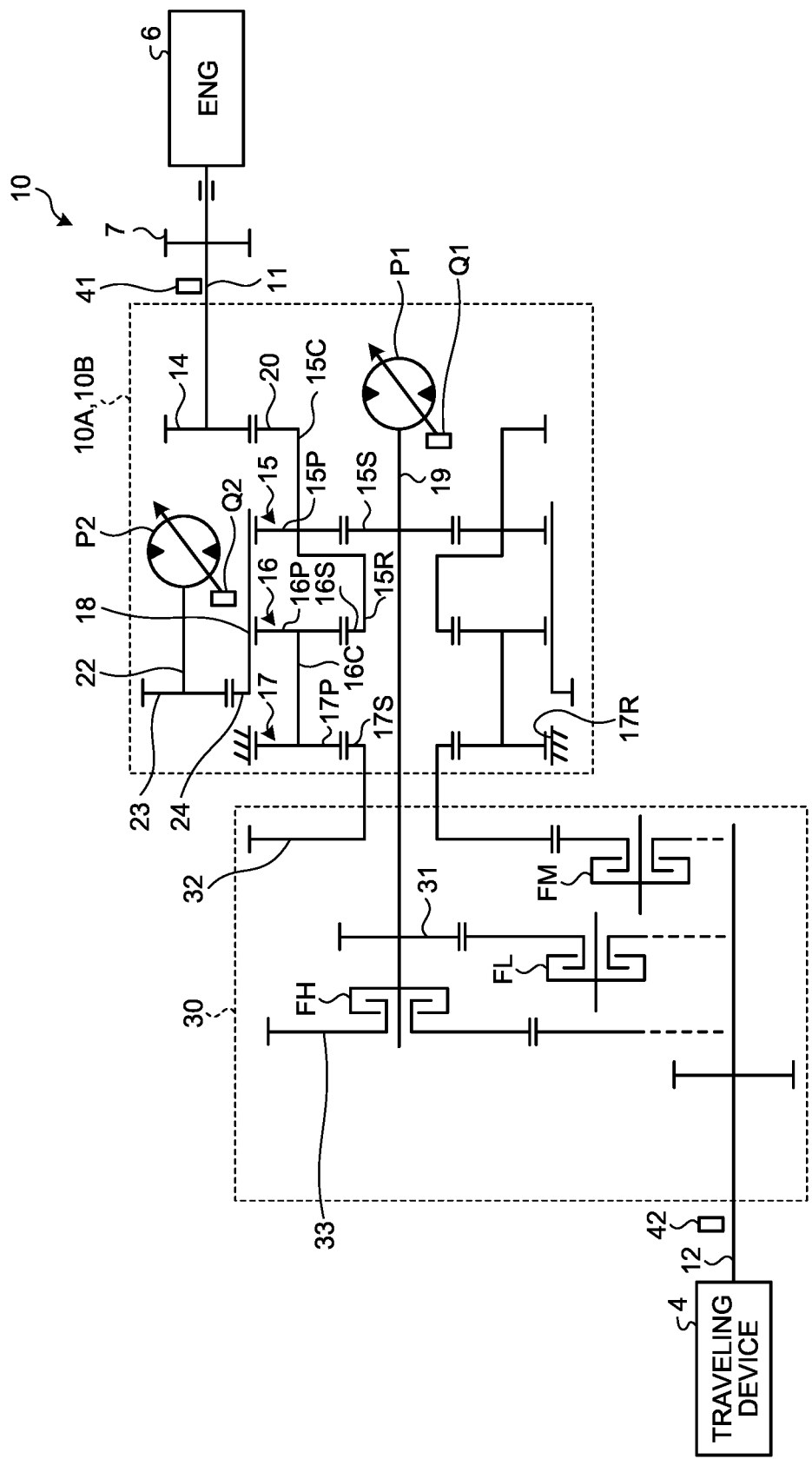
FIG. 3 is a diagram schematically illustrating an example of a power transmission device according to the present embodiment.

FIG. 3 is a diagram schematically illustrating an example of the power transmission device 10 according to the present embodiment. The power transmission device 10 transmits the power input to the input shaft 11 to the output shaft 12 via the clutch mechanism 30.

The power transmission device 10 includes a mechanical transmission mechanism 10A that includes a planetary gear mechanism 15, a planetary gear mechanism 16, and a planetary gear mechanism 17 and transmits a part of the power input to the input shaft 11 to the output shaft 12 via the clutch mechanism 30, and the hydraulic transmission mechanism 10B that includes the first hydraulic pump motor P1 and the second hydraulic pump motor P2 and transmits a part of the power input to the input shaft 11 to the output shaft 12 via a part of the mechanical transmission mechanism 10A and the clutch mechanism 30.

The input shaft 11 is connected to the engine 6 via the power take-off 7. The power generated by the engine 6 is transmitted to the input shaft 11 via the power take-off 7. The input shaft 11 rotates based on the power transmitted from the engine 6. An input gear 14 is fixed to the input shaft 11.

The planetary gear mechanism 15 includes a sun gear 15S, a plurality of planetary gears 15P disposed around the sun gear 15S, and a carrier 15C that rotatably supports the plurality of planetary gears 15P. The plurality of planetary gears 15P mesh with each of the sun gear 15S and a ring gear 18. The planetary gear 15P can revolve around the sun gear 15S. The ring gear 18 is disposed around the plurality of planetary gears 15P. The sun gear 15S is connected to the first hydraulic pump motor P1 via a transmission shaft 19. A carrier gear 20 is provided on an outer circumference of the carrier 15C. The input gear 14 meshes with the carrier gear 20.

The planetary gear mechanism 16 includes a sun gear 16S, a plurality of planetary gears 16P disposed around the sun gear 16S, and a carrier 16C that rotatably supports the plurality of planetary gears 16P. The plurality of planetary gears 16P mesh with each of the sun gear 16S and the ring gear 18. The planetary gear 16P can revolve around the sun gear 16S. The ring gear 18 is disposed around the plurality of planetary gears 16P. The sun gear 16S is connected to the planetary gear 15P via a sleeve 15R. The sleeve 15R is disposed around the transmission shaft 19.

The planetary gear mechanism 17 includes a sun gear 17S, a plurality of planetary gears 17P disposed around the sun gear 17S, and a ring gear 17R disposed around the planetary gears 17P. The plurality of planetary gears 17P mesh with each of the sun gear 17S and the ring gear 17R. The planetary gear 17P and the planetary gear 16P are connected via the carrier 16C. As the planetary gear 16P revolves, the planetary gear 17P revolves.

In the present embodiment, a rotation axis of the sun gear 15S of the planetary gear mechanism 15, a rotation axis of the sun gear 16S of the planetary gear mechanism 16, a rotation axis of the sun gear 17S of the planetary gear mechanism 17, and a rotation axis of the transmission shaft 19 coincide with each other.

The hydraulic transmission mechanism 10B includes a transmission shaft 22 connected to the second hydraulic pump motor P2. A gear 23 is fixed to the transmission shaft 22. The gear 23 meshes with an outer circumference gear 24 provided on an outer circumference of the ring gear 18.

[Clutch Mechanism]

The clutch mechanism 30 includes a low-speed gear 31, a medium-speed gear 32, a high-speed gear 33, a forward-low-speed clutch FL, a forward-medium-speed clutch FM, and a forward-high-speed clutch FH. A rotation axis of the low-speed gear 31, a rotation axis of the medium-speed gear 32, a rotation axis of the high-speed gear 33, and a rotation axis of the transmission shaft 19 coincide with each other.

The low-speed gear 31 is connected to the transmission shaft 19. The low-speed gear 31 is rotatable together with the transmission shaft 19. The low-speed gear 31 is connected to the output shaft 12 via the forward-low-speed clutch FL.

The medium-speed gear 32 is connected to the sun gear 17S. The medium-speed gear 32 is formed integrally with the sun gear 17S. Note that the medium-speed gear 32 may be provided separately from the sun gear 17S. The medium-speed gear 32 is rotatable together with the sun gear 17S. The medium-speed gear 32 is connected to the output shaft 12 via the forward-medium-speed clutch FM.

The high-speed gear 33 is connected to the transmission shaft 19 via the forward-high-speed clutch FH. In a state where the forward-high-speed clutch FH is engaged, the high-speed gear 33 is rotatable together with the transmission shaft 19. The high-speed gear 33 is connected to the output shaft 12.

The forward-low-speed clutch FL, the forward-medium-speed clutch FM, and the forward-high-speed clutch FL are, for example, hydraulic clutches. The forward-low-speed clutch FL, the forward-medium-speed clutch FM, and the forward-high-speed clutch FL are controlled by the control device 100.

The forward-low-speed clutch FL performs switching between connection and disconnection between the output shaft 12 and the transmission shaft 19. In a state where the forward-low-speed clutch FL is engaged, the rotation of the transmission shaft 19 is transmitted to the output shaft 12 via the low-speed gear 31.

The forward-medium-speed clutch FM performs switching between connection and disconnection between the output shaft 12 and the sun gear 17S. In a state where the forward-medium-speed clutch FM is engaged, the rotation of the sun gear 17S is transmitted to the output shaft 12 via the medium-speed gear 32.

The forward-high-speed clutch FH performs switching between connection and disconnection between the output shaft 12 and the transmission shaft 19. In a state where the forward-high-speed clutch FH is engaged, the rotation of the transmission shaft 19 is transmitted to the output shaft 12.

Note that, in FIG. 3, some of components between the forward-low-speed clutch FL, the forward-medium-speed clutch FM, and the forward-high-speed clutch FH, and the output shaft 12 are omitted. Another clutch or gear may be disposed between the output shaft 12 and at least one of the forward-low-speed clutch FL, the forward-medium-speed clutch FM, or the forward-high-speed clutch FH. For example, a forward gear and a reverse gear may be disposed between the output shaft 12 and at least one of the forward-low-speed clutch FL, the forward-medium-speed clutch FM, or the forward-high-speed clutch FH. In the present embodiment, a reverse-low-speed clutch RL and a reverse-medium-speed clutch RM are provided.

In the following description, the forward-low-speed clutch FL, the forward-medium-speed clutch FM, the forward-high-speed clutch FH, the reverse-low-speed clutch RL, and the reverse-medium-speed clutch RM are collectively referred to as clutches as appropriate. The clutch includes an input-side element and an output-side element. The input-side element and the output-side element are connectable and disconnectable. The input-side element refers to an element that rotates in synchronization with the input shaft 11 by the rotation of the input shaft 11 even when the input-side element and the output-side element are disconnected. The output-side element refers to an element that rotates in synchronization with the output shaft 12 by the rotation of the output shaft 12 even when the output-side element and the input-side element are disconnected. Even when the output shaft 12 rotates in a state where the input-side element and the output-side element are disconnected, the input-side element is not affected by the rotation of the output shaft 12. Even when the input shaft 11 rotates in a state where the output-side element and the input-side element are disconnected, the output-side element is not affected by the rotation of the input shaft 11. Generally, the clutch includes a disc and a plate. One of the disc and the plate functions as the input-side element, and the other of the disc and the plate functions as the output-side element.

As the clutch is engaged, the input-side element and the output-side element of the clutch are connected. As the clutch is released, the input-side element and the output-side element of the clutch are disconnected.

The clutch mechanism 30 performs switching between a plurality of modes for a power transmission path. In the present embodiment, the modes include a forward-low-speed mode, a forward-medium-speed mode, a forward-high-speed mode, a reverse-low-speed mode, and a reverse-medium-speed mode. The forward-low-speed mode is a mode in which a speed ratio of the wheel loader 1 that moves forward is low. The forward-medium-speed mode is a mode in which the speed ratio of the wheel loader 1 that moves forward is medium. The forward-high-speed mode is a mode in which the speed ratio of the wheel loader 1 that moves forward is high. The reverse-low-speed mode is a mode in which the speed ratio of the wheel loader 1 that reverses is low. The reverse-medium-speed mode is a mode in which the speed ratio of the wheel loader 1 that reverses is medium.

[Mode Switching]

Figure 4:
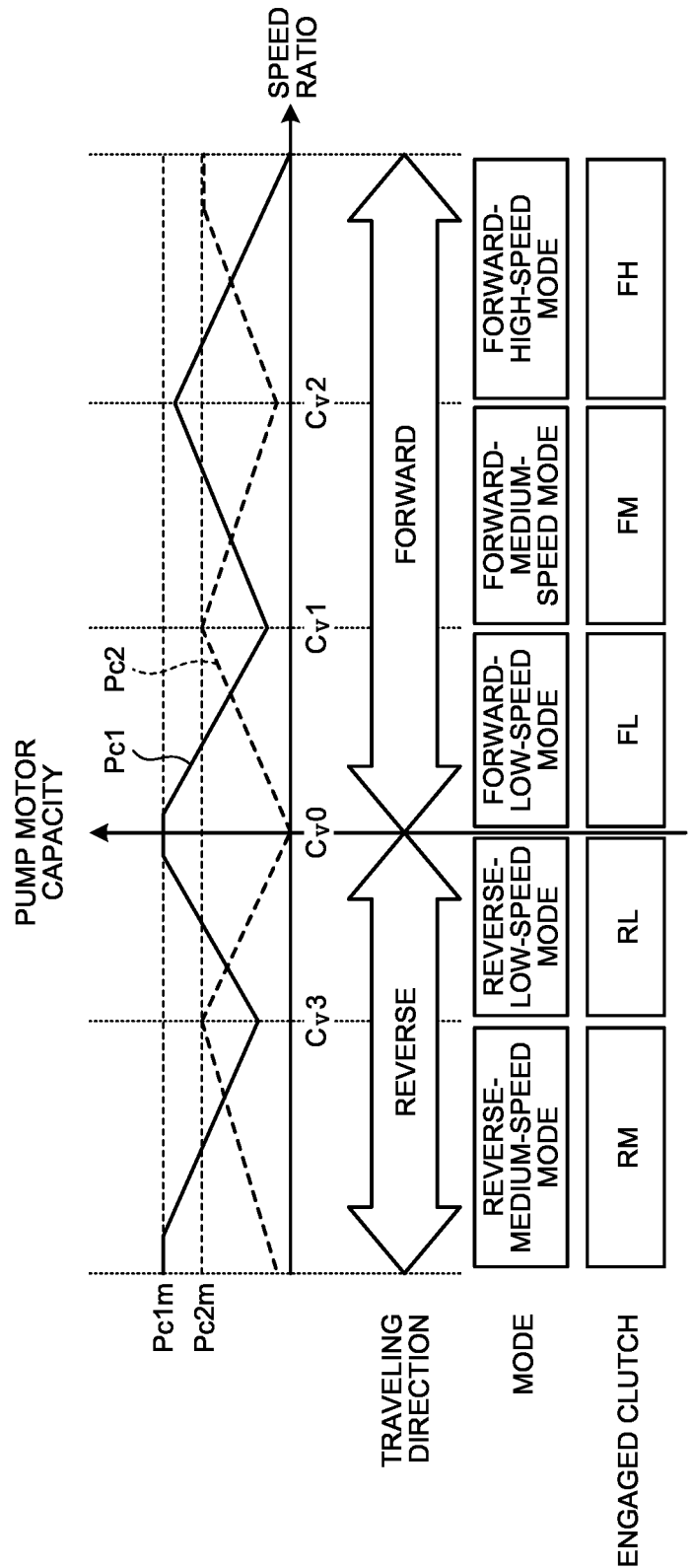
FIG. 4 is a diagram schematically illustrating a relationship among a mode, a state of a clutch mechanism, and a state of each of a first hydraulic pump motor and a second hydraulic pump motor according to the present embodiment.

FIG. 4 is a diagram schematically illustrating a relationship among the mode, a state of the clutch mechanism 30, and a state of each of the first hydraulic pump motor P1 and the second hydraulic pump motor P2 according to the present embodiment.

The forward-low-speed clutch FL is engaged in the forward-low-speed mode. The input-side element of the forward-low-speed clutch FL is connected to the low-speed gear 31. The output-side element of the forward-low-speed clutch FL is connected to the output shaft 12 via a gear (not illustrated) or another clutch. The forward-low-speed clutch FL performs switching between connection and disconnection between the low-speed gear 31 and the output shaft 12.

The forward-medium-speed clutch FM is engaged in the forward-medium-speed mode. The input-side element of the forward-medium-speed clutch FM is connected to the medium-speed gear 32. The output-side element of the forward-medium-speed clutch FM is connected to the output shaft 12 via a gear (not illustrated) or another clutch. The forward-medium-speed clutch FM performs switching between connection and disconnection between the medium-speed gear 32 and the output shaft 12.

The forward-high-speed clutch FH is engaged in the forward-high-speed mode. The input-side element of the forward-high-speed clutch FH is connected to the high-speed gear 33. The output-side element of the forward-high-speed clutch FH is connected to the output shaft 12 via a gear (not illustrated) or another clutch. The forward-high-speed clutch FH performs switching between connection and disconnection between the high-speed gear 33 and the output shaft 12.

Further, the reverse-low-speed clutch RL (not illustrated) is engaged in the reverse-low-speed mode, and the reverse-medium-speed clutch RM (not illustrated) is engaged in the reverse-medium-speed mode.

As illustrated in FIG. 4, each of the capacity Pc1 of the first hydraulic pump motor P1 and the capacity Pc2 of the second hydraulic pump motor P2 is adjusted based on the speed ratio. The speed ratio refers to a ratio between the rotation speed of the input shaft 11 and the rotation speed of the output shaft 12. That is, a relationship of [speed ratio] =[rotation speed of output shaft 12]/[rotation speed of input shaft 11] is established. In a case where the rotation speed of the input shaft 11 is constant, the speed ratio corresponds to the traveling speed of the wheel loader 1.

A power transmission path in the forward-low-speed mode will be described. In the forward-low-speed mode, the forward-low-speed clutch FL is engaged, and other clutches are released.

When power is input from the engine 6 to the input shaft 11, the input gear 14 rotates, and the carrier 15C rotates. As the carrier 15C rotates, the planetary gear 15P revolves, and the sun gear 15S rotates. As the sun gear 15S rotates, the transmission shaft 19 rotates. As the transmission shaft 19 rotates, the low-speed gear 31 rotates. Since the forward-low-speed clutch FL is engaged, the output shaft 12 rotates by the rotation of the low-speed gear 31.

Next, a power transmission path in the forward-medium-speed mode will be described. In the forward-medium-speed mode, the forward-medium-speed clutch FM is engaged, and other clutches are released.

When power is input from the engine 6 to the input shaft 11, the input gear 14 rotates, and the carrier 15C rotates. As the carrier 15C rotates, the planetary gear 15P revolves, and the planetary gear 16P connected to the planetary gear 15P via the carrier 16C revolves. As the planetary gear 16P revolves, the medium-speed gear 32 rotates. Since the forward-medium-speed clutch FM is engaged, the output shaft 12 rotates by the rotation of the medium-speed gear 32.

Next, a power transmission path in the forward-high-speed mode will be described. In the forward-high-speed mode, the forward-high-speed clutch FH is engaged, and other clutches are released.

When power is input from the engine 6 to the input shaft 11, the input gear 14 rotates, and the carrier 15C rotates. As the carrier 15C rotates, the planetary gear 15P revolves, and the sun gear 15S rotates. As the sun gear 15S rotates, the transmission shaft 19 rotates. As the transmission shaft 19 rotates, the high-speed gear 33 rotates. Since the high-speed clutch FM is engaged, the output shaft 12 is engaged by the rotation of the high-speed gear 33.

The power transmission paths in the forward-low-speed mode, the forward-medium-speed mode, and the forward-high-speed mode have been described above. A description of power transmission paths in the reverse-low-speed mode and the reverse-medium-speed mode will be omitted.

The clutch to be engaged is switched at a predetermined switching speed ratio Cv. As illustrated in FIG. 4, the switching speed ratio Cv includes a reference switching speed ratio Cv0, a first switching speed ratio Cv1, a second switching speed ratio Cv2, and a third switching speed ratio Cv3. A value of the reference switching speed ratio Cv0 is zero. Note that the reference switching speed ratio Cv0 may have a value approximate to zero. The first switching speed ratio Cv1 is a speed ratio when the wheel loader 1 moves forward, and is a value higher than the reference switching speed ratio Cv0. The second switching speed ratio Cv2 is a speed ratio when the wheel loader 1 moves forward, and is a value higher than the first switching speed ratio Cv1. The third switching speed ratio Cv3 is a speed ratio when the wheel loader 1 reverses, and is a value lower than the reference switching speed ratio Cv0.

A clutch engaged at a speed ratio between the reference switching speed ratio Cv0 and the first switching speed ratio Cv1 is the forward-low-speed clutch FL. A clutch engaged at a speed ratio between the first switching speed ratio Cv1 and the second switching speed ratio Cv2 is the forward-medium-speed clutch FM. A clutch engaged at a speed ratio higher than the second switching speed ratio Cv2 is the forward-high-speed clutch FH. A clutch engaged at a speed ratio between the reference switching speed ratio Cv0 and the third switching speed ratio Cv3 is the reverse-low-speed clutch RL. A clutch engaged at a speed ratio lower than the third switching speed ratio Cv3 is the reverse-medium-speed clutch RM.

At the first switching speed ratio Cv1, the clutch to be engaged is switched from one of the forward-low-speed clutch FL and the forward-medium-speed clutch FM to the other. At the second switching speed ratio Cv2, the clutch to be engaged is switched from one of the forward-medium-speed clutch FM and the forward-high-speed clutch FH to the other. At the third switching speed ratio Cv3, the clutch to be engaged is switched from one of the reverse-low-speed clutch RL and the reverse-medium-speed clutch RM to the other. At the reference switching speed ratio Cv0, the clutch to be engaged is switched from one of the forward-low-speed clutch FL and the reverse-low-speed clutch RL to the other.

[Control Device]

Figure 5:
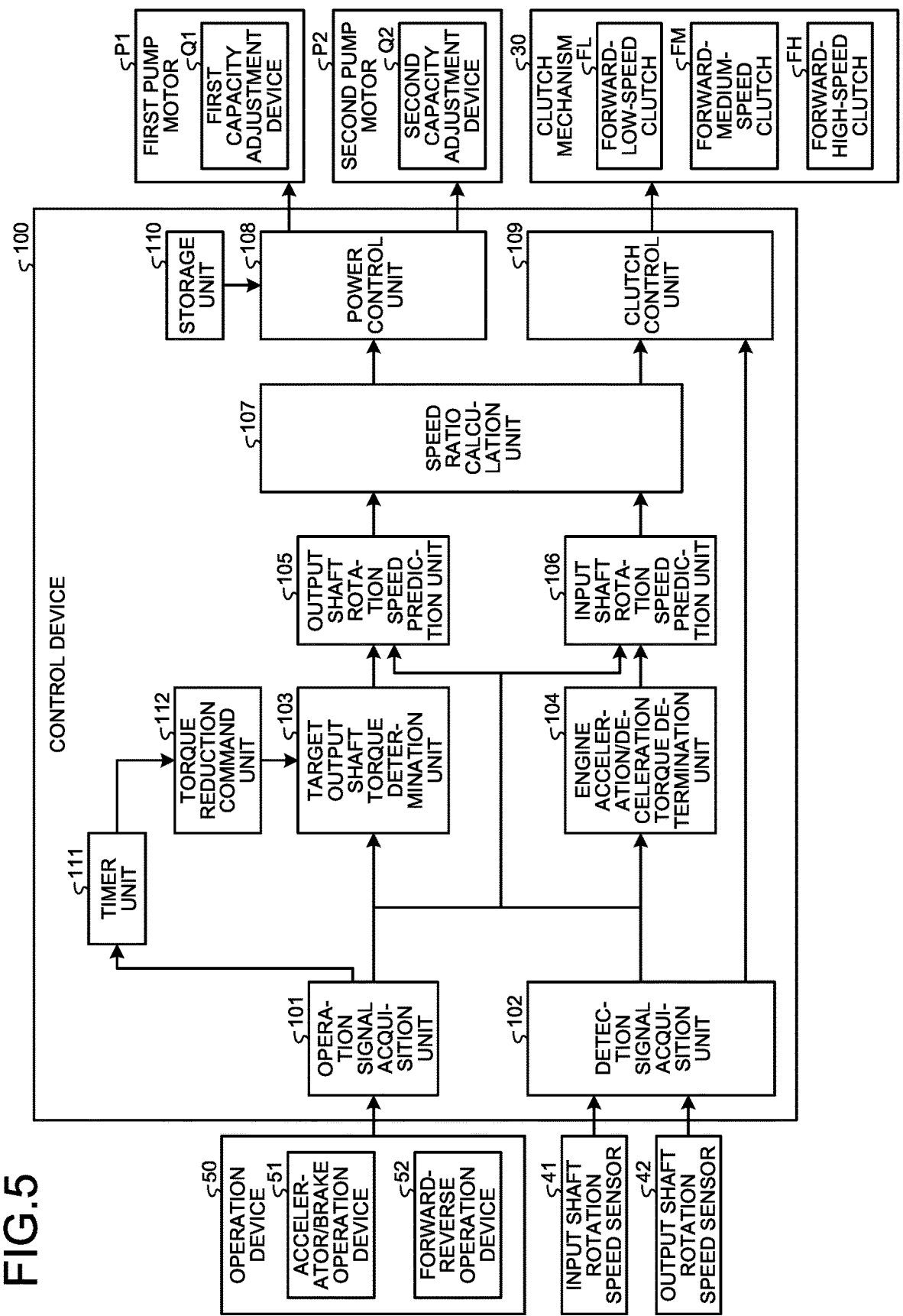
FIG. 5 is a functional block diagram illustrating an example of a control device according to the present embodiment.

FIG. 5 is a functional block diagram illustrating an example of the control device 100 according to the present embodiment. As illustrated in FIG. 5, the control device 100 is connected to the operation device 50 including the accelerator/brake operation device 51 and the forward-reverse operation device 52. The control device 100 is connected to each of the input shaft rotation speed sensor 41 and the output shaft rotation speed sensor 42. The control device 100 is connected to each of the first hydraulic pump motor P1 including the first capacity adjustment device Q1 and the second hydraulic pump motor P2 including the second capacity adjustment device Q2. The control device 100 is connected to the clutch mechanism 30 including the forward-low-speed clutch FL, the forward-medium-speed clutch FM, the forward-high-speed clutch FH, the reverse-low-speed clutch RL, and the reverse-medium-speed clutch RM.

The control device 100 includes a computer system. The control device 100 includes an arithmetic processing device including a processor such as a central processing unit (CPU), a storage device including a memory such as a read only memory (ROM) or a random access memory (RAM), and an input/output interface.

The control device 100 includes an operation signal acquisition unit 101, a detection signal acquisition unit 102, a target output shaft torque determination unit 103, an engine acceleration/deceleration torque determination unit 104, an output shaft rotation speed prediction unit 105, an input shaft rotation speed prediction unit 106, a speed ratio calculation unit 107, a power control unit 108, a clutch control unit 109, a storage unit 110, a timer unit 111, and a torque reduction command unit 112.

The operation signal acquisition unit 101 acquires an operation signal generated by the operation of the operation device 50.

When the accelerator/brake operation device 51 is operated by the driver, the accelerator/brake operation device 51 generates at least one of an operation signal for driving the traveling device 4 or an operation signal for braking the traveling device 4. When the accelerator/brake operation device 51 is operated by the driver, the operation signal acquisition unit 101 acquires at least one of the operation signal for driving the traveling device 4 or the operation signal for braking the traveling device 4.

When the forward-reverse operation device 52 is operated by the driver, the forward-reverse operation device 52 outputs at least one of an operation signal for changing the state of the traveling device 4 to the forward state, an operation signal for changing the state of the traveling device 4 to the neutral state, or an operation signal for changing the state of the traveling device 4 to the reverse state. When the forward-reverse operation device 52 is operated by the driver, the forward-reverse operation device 52 acquires at least one of the operation signal for changing the state of the traveling device 4 to the forward state, the operation signal for changing the traveling device 4 to the neutral state, or the operation signal for changing the state of the traveling device 4 to the reverse state.

As described above, the forward-reverse operation device 52 includes the forward-reverse operation member. In a case of changing the state of the traveling device 4 between the forward state and the reverse state, the forward-reverse operation member is moved from one of the F position and the R position to the other via the N position. In a case where the forward-reverse operation member is moved from the N position to the F position, the forward-reverse operation device 52 outputs the operation signal for changing the state of the traveling device 4 to the forward state. In a case where the forward-reverse operation member is moved from the N position to the R position, the forward-reverse operation device 52 outputs the operation signal for changing the state of the traveling device 4 to the reverse state. In a case where the forward-reverse operation member is moved from one of the F position and the R position to the N position, the forward-reverse operation device 52 outputs the operation signal for changing the state of the traveling device 4 to the neutral state.

The detection signal acquisition unit 102 acquires a detection signal of the input shaft rotation speed sensor 41 and a detection signal of the output shaft rotation speed sensor 42. The detection signal of the input shaft rotation speed sensor 41 indicates the rotation speed of the input shaft 11. The detection signal of the output shaft rotation speed sensor 42 indicates the rotation speed of the output shaft 12.

The target output shaft torque determination unit 103 calculates a target output shaft torque indicating a target torque of the output shaft 12 based on the traveling speed of the wheel loader 1 and the operation signal of the accelerator/brake operation device 51. The target output shaft torque determination unit 103 calculates the traveling speed of the wheel loader 1 based on the detection signal of the output shaft rotation speed sensor 42 acquired by the detection signal acquisition unit 102. The target output shaft torque determination unit 103 acquires the operation signal of the accelerator/brake operation device 51 from the operation signal acquisition unit 101. The target output shaft torque determination unit 103 determines the target output shaft torque based on the traveling speed of the wheel loader 1 calculated from the detection signal of the output shaft rotation speed sensor 42 acquired by the detection signal acquisition unit 102 and the operation signal of the accelerator/brake operation device 51 acquired by the operation signal acquisition unit 101. For example, when the wheel loader 1 moves forward, in a case where the operation signal for driving the traveling device 4 is acquired, the target output shaft torque increases. In a case where the operation signal for braking the traveling device 4 is acquired, the target output shaft torque decreases. In a case where the traveling speed of the wheel loader 1 is low, the target output shaft torque increases. In a case where the traveling speed of the wheel loader 1 is high, the target output shaft torque decreases.

The engine acceleration/deceleration torque determination unit 104 calculates an engine acceleration/deceleration torque indicating a target torque of the engine 6 based on the traveling speed of the wheel loader 1 and the operation signal of the accelerator/brake operation device 51. The engine acceleration/deceleration torque corresponds to a target input shaft torque indicating a target torque of the input shaft 11. The engine acceleration/deceleration torque determination unit 104 calculates the traveling speed of the wheel loader 1 based on the detection signal of the output shaft rotation speed sensor 42 acquired by the detection signal acquisition unit 102. The engine acceleration/deceleration torque determination unit 104 acquires the operation signal of the accelerator/brake operation device 51 from the operation signal acquisition unit 101. The engine acceleration/deceleration torque determination unit 104 determines the engine acceleration/deceleration torque based on the traveling speed of the wheel loader 1 calculated from the detection signal of the output shaft rotation speed sensor 42 acquired by the detection signal acquisition unit 102 and the operation signal of the accelerator/brake operation device 51 acquired by the operation signal acquisition unit 101. For example, in a case where the operation signal for driving the traveling device 4 is acquired, the engine acceleration/deceleration torque increases. In a case where the operation signal for braking the traveling device 4 is acquired, the engine acceleration/deceleration torque decreases.

Based on the target output shaft torque and the detection signal of the output shaft rotation speed sensor 42, the output shaft rotation speed prediction unit 105 calculates an estimated output shaft rotation speed indicating a predictive value of the rotation speed of the output shaft 12 at a prediction time point after a predetermined time from a current time point. Note that the output shaft rotation speed prediction unit 105 may estimate the predictive value of the rotation speed of the output shaft by using an output shaft load torque estimated by a certain method. The current time point includes a time point at which the target output shaft torque is calculated and a time point at which the detection signal of the output shaft rotation speed sensor 42 is acquired by the detection signal acquisition unit 102.

Based on the engine acceleration/deceleration torque and the detection signal of the input shaft rotation speed sensor 41, the input shaft rotation speed prediction unit 106 calculates an estimated input shaft rotation speed indicating a predictive value of the rotation speed of the input shaft 11 at a prediction time point after a predetermined time from a current time point. The current time point includes a time point at which the engine acceleration/deceleration torque is calculated and a time point at which the detection signal of the input shaft rotation speed sensor 41 is acquired by the detection signal acquisition unit 102.

Based on the estimated output shaft rotation speed and the estimated input shaft rotation speed, the speed ratio calculation unit 107 calculates a target speed ratio indicating a target value of the speed ratio at a prediction time point after a predetermined time from a current time point.

The power control unit 108 outputs a control command for controlling the power transmission device 10. In the present embodiment, the power control unit 108 outputs a control command for controlling at least one of the first hydraulic pump motor P1 or the second hydraulic pump motor P2. The control command output from the power control unit 108 includes a capacity command for changing at least one of the capacity Pc1 of the first hydraulic pump motor P1 or the capacity Pc2 of the second hydraulic pump motor P2. The power control unit 108 can output a capacity command for changing the capacity Pc1 of the first hydraulic pump motor P1 to the first capacity adjustment device Q1. The power control unit 108 can output a capacity command for changing the capacity Pc2 of the second hydraulic pump motor P2 to the second capacity adjustment device Q2.

The clutch control unit 109 outputs a control command for controlling the clutch mechanism 30. The control command output from the clutch control unit 109 includes a clutch command for engaging a specified clutch among the plurality of clutches of the clutch mechanism 30 and a release command for releasing the engaged clutch.

The storage unit 110 stores data used for a control of at least one of the first hydraulic pump motor P1, the second hydraulic pump motor P2, or the clutch mechanism 30. In the present embodiment, the storage unit 110 stores correlation data indicating a relationship between the speed ratio and the capacity Pc1 of the first hydraulic pump motor P1 and the capacity Pc2 of the second hydraulic pump motor P2.

The power control unit 108 outputs the capacity command for changing at least one of the capacity Pc1 of the first hydraulic pump motor P1 or the capacity Pc2 of the second hydraulic pump motor P2 based on the target speed ratio calculated by the speed ratio calculation unit 107 and the correlation data stored in the storage unit 110.

The clutch control unit 109 outputs the clutch command for engaging a specified clutch among the plurality of clutches of the clutch mechanism 30 based on the target speed ratio calculated by the speed ratio calculation unit 107. In addition, the clutch control unit 109 calculates an actual speed ratio based on the detection signal of the input shaft rotation speed sensor 41 and the detection signal of the output shaft rotation speed sensor 42, and outputs the clutch command for engaging a specified clutch among the plurality of clutches of the clutch mechanism 30 based on the actual speed ratio.

The timer unit 111 measures an elapsed time from a time point t0 at which an operation signal for changing the state of the forward-reverse operation device 52 from the forward state or the reverse state to the neutral state is acquired by the operation signal acquisition unit 101, the operation signal being generated by the operation of the forward-reverse operation device 52 in a state where a first clutch among the plurality of clutches of the clutch mechanism 30 is engaged. That is, the timer unit 111 measures the elapsed time from the time point t0 at which the forward-reverse operation member is moved from one of the F position and the R position to the N position.

The torque reduction command unit 112 outputs a torque reduction command for reducing a torque of the output shaft 12 in a state where the first clutch is engaged before a specified time elapses from the time point to. In the present embodiment, the torque reduction command unit 112 outputs the torque reduction command to the target output shaft torque determination unit 103. When the torque reduction command is output, the target output shaft torque determination unit 103 determines the target output shaft torque to be zero.

The clutch control unit 109 outputs a release command for releasing the first clutch after a specified time elapses from the time point t0.

In a state where the first clutch is released, the power control unit 108 outputs the control command for controlling at least one of the first hydraulic pump motor P1 or the second hydraulic pump motor P2 so that a rotation speed of an input-side element of a second clutch to be engaged next coincides with a rotation speed of an output-side element of the second clutch.

The second clutch to be engaged next is determined based on the speed ratio. The clutch control unit 109 determines the second clutch to be engaged next based on the speed ratio indicating the ratio between the rotation speed of the input shaft 11 and the rotation speed of the output shaft 12.

The clutch control unit 109 determines the second clutch to be engaged next based on the actual speed ratio calculated from the detection signal of the input shaft rotation speed sensor 41 and the detection signal of the output shaft rotation speed sensor 42.

After the second clutch is determined, the power control unit 108 outputs a control command based on the actual speed ratio and the correlation data stored in the storage unit 110 so that the rotation speed of the input-side element of the second clutch to be engaged next coincides with the rotation speed of the output-side element. In the present embodiment, the power control unit 108 outputs the capacity command for changing at least one of the capacity Pc1 of the first hydraulic pump motor P1 or the capacity Pc2 of the second hydraulic pump motor P2 based on the actual speed ratio and the correlation data stored in the storage unit 110 so that the rotation speed of the input-side element of the second clutch to be engaged next coincides with the rotation speed of the output-side element.

A function as the hydraulic pump and a function as the hydraulic motor of the first hydraulic pump motor P1 and the second hydraulic pump motor P2 are switched based on the speed ratio. The power control unit 108 outputs a capacity command so that the capacity (Pc1 or Pc2) of at least one of the first hydraulic pump motor P1 or the second hydraulic pump motor P2 that functions the hydraulic motor is changed at the speed ratio at which the second clutch is engaged.

The clutch control unit 109 outputs a clutch command for engaging the second clutch when the second clutch to be engaged next is determined, the neutral state of the forward-reverse operation device 52 is released, and the rotation speed of the input-side element of the second clutch coincides with the rotation speed of the output-side element. The clutch control unit 109 may output the clutch command for engaging the second clutch after a difference between the rotation speed of the input-side element and the rotation speed of the output-side element of the second clutch becomes equal to or less than a predetermined allowable value.

[Correlation Data]

Figure 6:
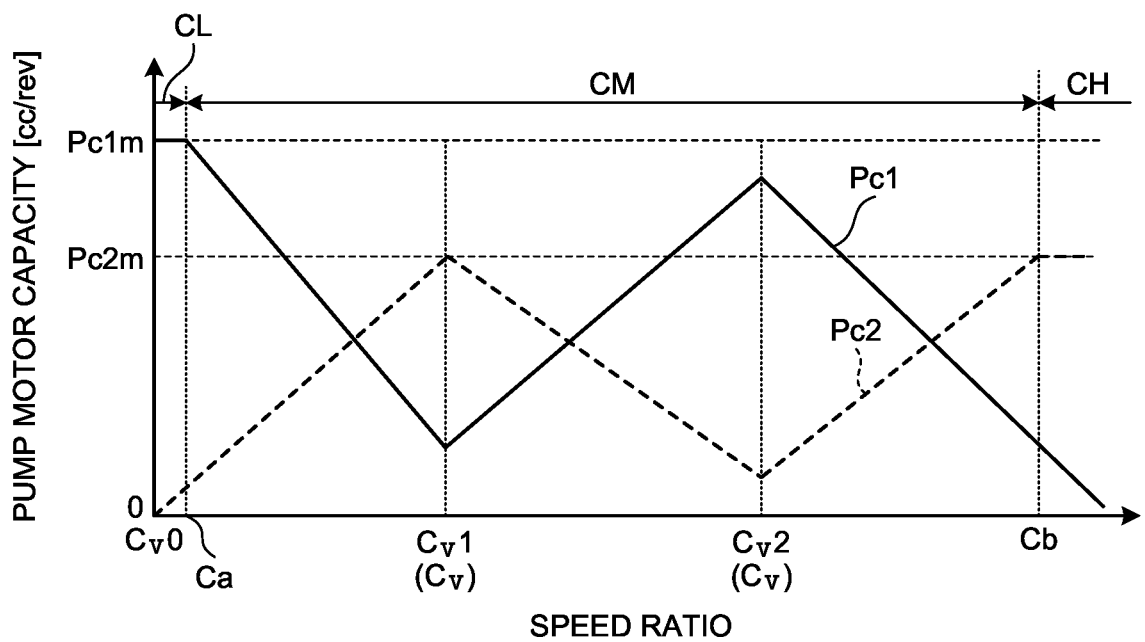
FIG. 6 is a diagram schematically illustrating an example of correlation data according to the present embodiment.

FIG. 6 is a diagram schematically illustrating an example of the correlation data according to the present embodiment. As illustrated in FIG. 6, the correlation data indicates the relationship between the speed ratio and the capacity Pc1 of the first hydraulic pump motor P1 and the capacity Pc2 of the second hydraulic pump motor P2. In FIG. 6, a horizontal axis represents the speed ratio, and a vertical axis represents the capacity [cc/rev]. FIG. 6 illustrates the correlation data when the wheel loader 1 moves forward.

As illustrated in FIG. 6, in the present embodiment, the correlation data is set so that both the capacity Pc1 of the first hydraulic pump motor P1 and the capacity Pc2 of the second hydraulic pump motor P2 are changed with a change in the speed ratio in a predetermined speed ratio range CM between a first speed ratio Ca and a second speed ratio Cb higher than the first speed ratio Ca. The first speed ratio Ca is a value higher than the reference switching speed ratio Cv0. The second speed ratio Cb is a value higher than the first speed ratio Ca.

The correlation data is set so that, in the predetermined speed ratio range CM, when one of the capacity Pc1 of the first hydraulic pump motor P1 and the capacity Pc2 of the second hydraulic pump motor P2 increases with a change in the speed ratio, the other of the capacity Pc1 of the first hydraulic pump motor P1 and the capacity Pc2 of the second hydraulic pump motor P2 decreases.

The predetermined speed ratio range CM includes the switching speed ratio Cv at which the clutch to be engaged is switched. As described above, the switching speed ratio Cv includes the first switching speed ratio Cv1, the second switching speed ratio Cv2 higher than the first switching speed ratio Cv1, and the reference switching speed ratio Cv0 lower than the first switching speed ratio Cv1. As described with reference to FIG. 4, the switching speed ratio Cv includes the third switching speed ratio Cv3 lower than the reference switching speed ratio Cv0.

In the present embodiment, the predetermined speed ratio range CM includes the first switching speed ratio Cv1 and the second switching speed ratio Cv2.

The correlation data is set so that the capacity increases or decreases as the speed ratio increases from the switching speed ratio Cv, and the capacity increases or decreases as the speed ratio decreases from the switching speed ratio Cv. That is, in the correlation data, an inflection point of the capacity is set to the switching speed ratio Cv.

For example, the capacity Pc1 of the first hydraulic pump motor P1 increases as the speed ratio increases from the first switching speed ratio Cv1, the capacity Pc1 of the first hydraulic pump motor P1 increases as the speed ratio decreases from the first switching speed ratio Cv1, the capacity Pc1 of the first hydraulic pump motor P1 decreases as the speed ratio increases from the second switching speed ratio Cv2, and the capacity Pc1 of the first hydraulic pump motor P1 decreases as the speed ratio decreases from the second switching speed ratio Cv2. The capacity Pc2 of the second hydraulic pump motor P2 decreases as the speed ratio increases from the first switching speed ratio Cv1, the capacity Pc2 of the second hydraulic pump motor P2 decreases as the speed ratio decreases from the first switching speed ratio Cv1, the capacity Pc2 of the second hydraulic pump motor P2 increases as the speed ratio increases from the second switching speed ratio Cv2, and the capacity Pc2 of the second hydraulic pump motor P2 increases as the speed ratio decreases from the second switching speed ratio Cv2.

The correlation data is set so that when one of the capacity Pc1 of the first hydraulic pump motor P1 and the capacity Pc2 of the second hydraulic pump motor P2 increases at a speed ratio between the first switching speed ratio Cv1 and the second switching speed ratio Cv2, the other of the capacity Pc1 of the first hydraulic pump motor P1 and the capacity Pc2 of the second hydraulic pump motor P2 decreases.

As described above, the function as the hydraulic pump and the function as the hydraulic motor of the first hydraulic pump motor P1 and the second hydraulic pump motor P2 are switched at the switching speed ratio Cv. In the present embodiment, for example, when the wheel loader 1 is accelerated by power from the engine 6, the first hydraulic pump motor P1 functions as the hydraulic pump and the second hydraulic pump motor P2 functions as the hydraulic motor at a speed ratio between the first switching speed ratio Cv1 and the second switching speed ratio Cv2. Note that the function as the hydraulic pump and the function as the hydraulic motor are switched not only by the speed ratio but also by whether a torque transmitted to the output shaft 12 is for acceleration or for deceleration. The correlation data is set so that the capacity Pc2 of the second hydraulic pump motor P2 decreases when the capacity Pc1 of the first hydraulic pump motor P1 increases at a speed ratio between the first switching speed ratio Cv1 and the second switching speed ratio Cv2.

In the predetermined speed ratio range CM, the capacity Pc1 of the first hydraulic pump motor P1 is equal to or less than a maximum capacity Pc1m of the first hydraulic pump motor P1. The capacity Pc2 of the second hydraulic pump motor P2 is equal to or less than a maximum capacity Pc2m of the second hydraulic pump motor P2.

In the correlation data, the capacity Pc1 of the first hydraulic pump motor P1 at the switching speed ratio Cv is equal to or less than the maximum capacity Pc1m of the first hydraulic pump motor P1, and the capacity Pc2 of the second hydraulic pump motor P2 at the switching speed ratio Cv is equal to or less than the maximum capacity Pc2m of the second hydraulic pump motor P2.

The maximum capacity Pc1m is the capacity Pc1 of the first hydraulic pump motor P1 when the inclined shaft of the first hydraulic pump motor P1 is driven to a maximum angle, and is a value uniquely determined based on specifications of the first hydraulic pump motor P1. The maximum capacity Pc2m is the capacity Pc2 of the second hydraulic pump motor P2 when the inclined shaft of the second hydraulic pump motor P2 is driven to a maximum angle, and is a value uniquely determined based on specifications of the second hydraulic pump motor P2.

[Control Method]

Figure 7:
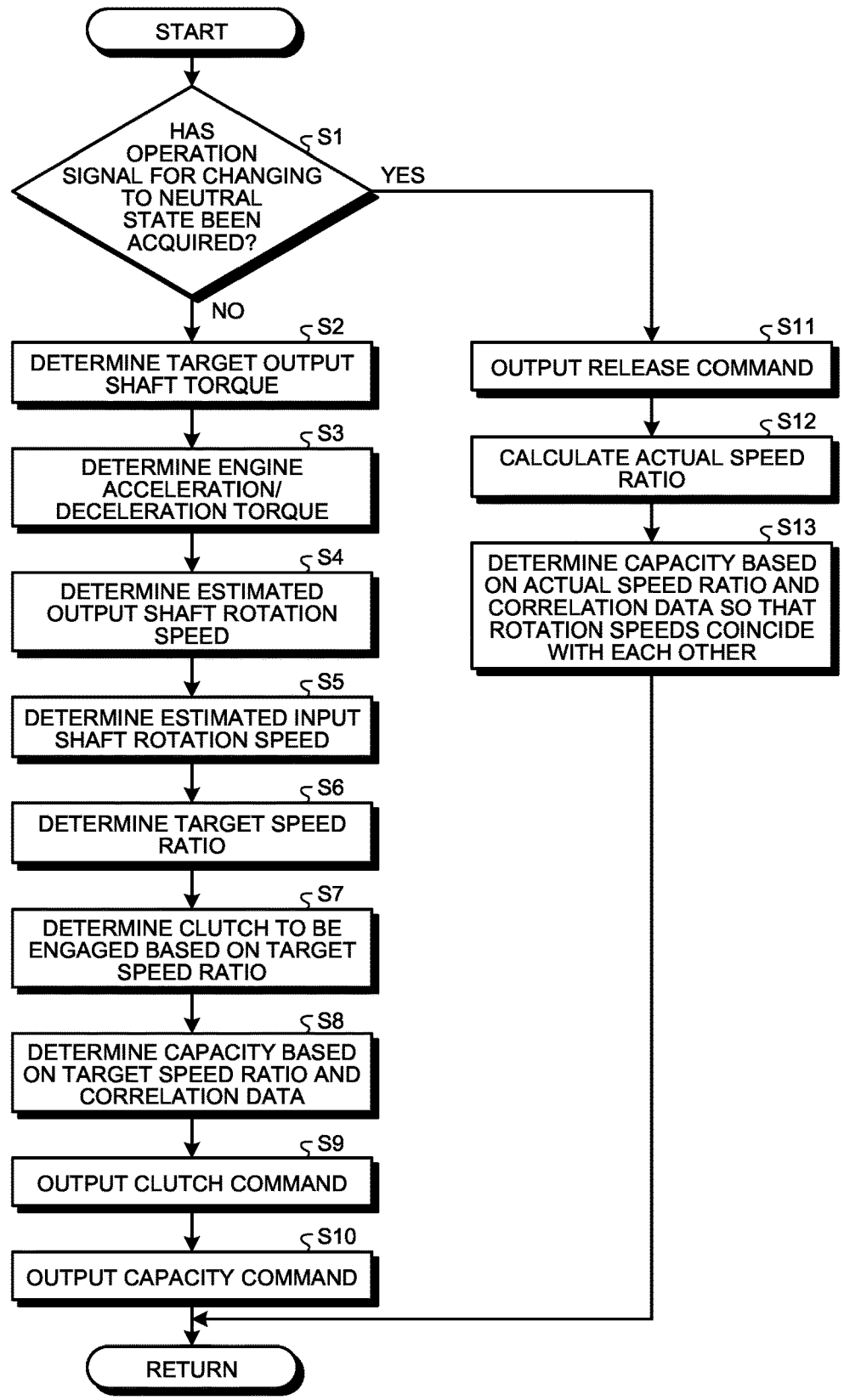
FIG. 7 is a flowchart illustrating an example of a control method for the work vehicle according to the present embodiment.

Next, a control method for the work vehicle 1 according to the present embodiment will be described. FIG. 7 is a flowchart illustrating an example of a control method for the wheel loader 1 according to the present embodiment.

The operation signal acquisition unit 101 determines whether or not the operation signal for changing the state of the traveling device 4 to the neutral state has been acquired (Step S1).

For example, in a case of changing the state of the wheel loader 1 from the reverse state to the forward state or in a case of changing the state of the wheel loader 1 from the forward state to the reverse state, the driver operates the forward-reverse operation member of the forward-reverse operation device 52. When the forward-reverse operation member is moved from the R position to the F position via the N position, or when the forward-reverse operation member is moved from the F position to the R position via the N position, the operation signal for changing the state of the traveling device 4 to the neutral state is output from the forward-reverse operation device 52 while the forward-reverse operation member is at the N position.

In a case where it is determined in Step S1 that the operation signal for changing the state of the traveling device 4 to the neutral state has not been acquired (Step S1: No), the target output shaft torque determination unit 103 calculates the target torque of the output shaft 12 based on the traveling speed of the wheel loader 1 and the operation signal of the accelerator/brake operation device 51, and determines the calculated target torque as the target output shaft torque (Step S2).

The engine acceleration/deceleration torque determination unit 104 calculates the target torque of the engine 6 based on the traveling speed of the wheel loader 1 and the operation signal of the accelerator/brake operation device 51, and determines the calculated target torque as the engine acceleration/deceleration torque (Step S3).

Based on the target output shaft torque determined in Step S2 and the detection signal of the output shaft rotation speed sensor 42, the output shaft rotation speed prediction unit 105 calculates the predictive value of the rotation speed of the output shaft 12 at the prediction time point after the predetermined time from the current time point, and determines the calculated predictive value as the estimated output shaft rotation speed (Step S4).

Based on the engine acceleration/deceleration torque determined in Step S3 and the detection signal of the input shaft rotation speed sensor 41, the input shaft rotation speed prediction unit 106 calculates the predictive value of the rotation speed of the input shaft 11 at the prediction time point after the predetermined time from the current time point, and determines the calculated predictive value as the estimated input shaft rotation speed (Step S5).

Based on the estimated output shaft rotation speed determined in Step S4 and the estimated input shaft rotation speed determined in Step S5, the speed ratio calculation unit 107 calculates the target value of the speed ratio at the prediction time point after the predetermined time from the current time point, and determines the calculated target value as the target speed ratio (Step S6).

The clutch control unit 109 determines a clutch to be engaged based on the target speed ratio determined in Step S6 (Step S7).

As described with reference to FIG. 4, the clutch to be engaged is determined in advance based on the speed ratio. The clutch control unit 109 determines the clutch to be engaged based on the target speed ratio.

The power control unit 108 determines the capacity Pc1 of the first hydraulic pump motor P1 and the capacity Pc2 of the second hydraulic pump motor P2 based on the target speed ratio determined in Step S6 and the correlation data stored in the storage unit 110 (Step S8).

The clutch control unit 109 outputs the clutch command for engaging the clutch determined in Step S7 to the clutch mechanism 30 (Step S9).

The power control unit 108 outputs the capacity command for changing at least one of the capacity Pc1 or the capacity Pc2 so as to become the capacity Pc1 or the capacity Pc2 determined in Step S8 (Step S10).

In a case where it is determined in Step S1 that the operation signal for changing the state of the traveling device 4 to the neutral state has been acquired (Step S1: Yes), the clutch control unit 109 outputs the release command to all the clutches of the clutch mechanism 30 including the engaged first clutch (Step S11).

The clutch control unit 109 calculates the actual speed ratio based on the detection signal of the input shaft rotation speed sensor 41 and the detection signal of the output shaft rotation speed sensor 42 acquired by the detection signal acquisition unit 102 (Step S12).

Based on the actual speed ratio calculated in Step S12 and the correlation data stored in the storage unit 110, the power control unit 108 determines at least one of the capacity Pc1 of the first hydraulic pump motor P1 or the capacity Pc2 of the second hydraulic pump motor P2 so that the rotation speed of the input-side element of the clutch to be engaged next coincides with the rotation speed of the output-side element (Step S13).

The power control unit 108 outputs the capacity command for changing at least one of the capacity Pc1 or the capacity Pc2 so as to become the capacity Pc1 or the capacity Pc2 determined in Step S16 (Step S10).

[Computer System]

Figure 8:
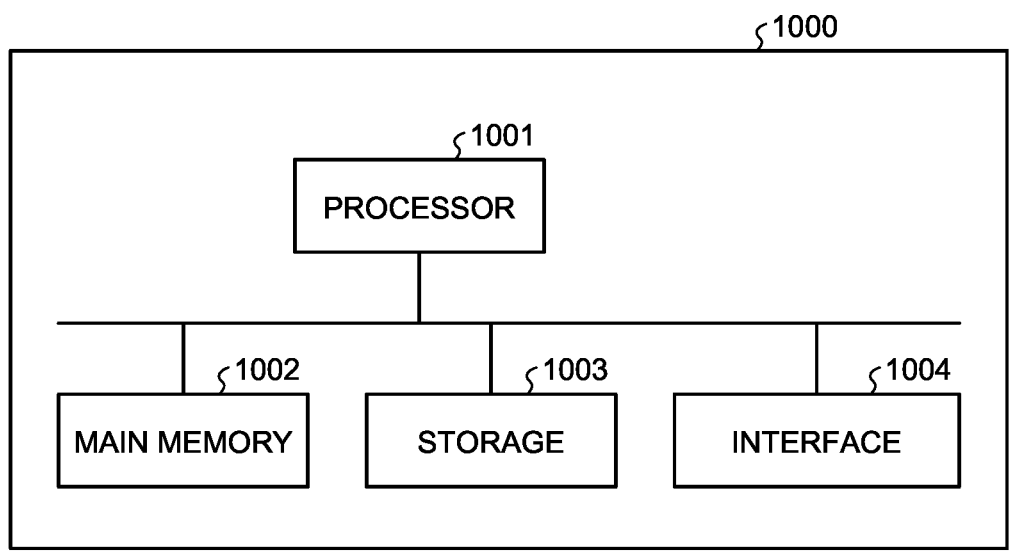
FIG. 8 is a block diagram illustrating an example of a computer system according to the present embodiment.

FIG. 8 is a block diagram illustrating an example of a computer system 1000 according to the present embodiment. The control device 100 described above includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. A function of the control device 100 described above is stored in the storage 1003 as a computer program. The processor 1001 reads the computer program from the storage 1003, loads the computer program to the main memory 1002, and performs the above-described processing according to the computer program. Note that the computer program may be distributed to the computer system 1000 via a network.

According to the above-described embodiment, the computer program causes the computer system 1000 to perform: transmitting power input to the input shaft 11 connected to the engine 6 to the output shaft 12 connected to the traveling device 4 via the clutch mechanism 30 and the power transmission device 10 including the hydraulic transmission mechanism 10B that includes the first hydraulic pump motor P1 functioning as one of the hydraulic pump and the hydraulic motor and the second hydraulic pump motor P2 functioning as the other of the hydraulic pump and the hydraulic motor; outputting the clutch command for engaging the specified clutch among the plurality of clutches of the clutch mechanism 30 based on the speed ratio indicating the ratio between the rotation speed of the input shaft 11 and the rotation speed of the output shaft 12; storing the correlation data indicating the relationship between the speed ratio and the capacity Pc1 of the first hydraulic pump motor P1 and the capacity Pc2 of the second hydraulic pump motor P2; and outputting the capacity command for changing at least one of the capacity Pc1 of the first hydraulic pump motor P1 or the capacity Pc2 of the second hydraulic pump motor P2 based on the speed ratio and the correlation data. The correlation data is set so that both the capacity Pc1 of the first hydraulic pump motor P1 and the capacity Pc2 of the second hydraulic pump motor P2 are changed with a change in the speed ratio in the predetermined speed ratio range CM between the first speed ratio Ca and the second speed ratio Cb higher than the first speed ratio Ca.

[Effects]

As described above, according to the present embodiment, at least one of the capacity Pc1 of the first hydraulic pump motor P1 or the capacity Pc2 of the second hydraulic pump motor P2 is changed based on the speed ratio and the correlation data. The correlation data is set so that both the capacity Pc1 of the first hydraulic pump motor P1 and the capacity Pc2 of the second hydraulic pump motor P2 are changed with a change in the speed ratio in the predetermined speed ratio range CM between the first speed ratio Ca and the second speed ratio Cb higher than the first speed ratio Ca. The setting is made so that both the capacity Pc1 and the capacity Pc2 are always changed with the change in the speed ratio in the predetermined speed ratio range CM, and thus, it is possible to reduce a time lag occurrence frequency when the swash plate or the inclined shaft starts to move, and it is possible to suppress sensory deterioration caused by the time lag.

Further, the setting is made so that both the capacity Pc1 of the first hydraulic pump motor P1 and the capacity Pc2 of the second hydraulic pump motor P2 are always changed with the change in the speed ratio in the predetermined speed ratio range CM. Therefore, as compared with a case where a certain capacity of one hydraulic pump motor is not changed and only a capacity of the other hydraulic pump motor is changed to change the motor capacity ratio, a change in capacity of each pump motor required to change the same motor capacity ratio is smaller in a case where the setting is made so that both capacities are always changed, and thus, insufficiency of responsiveness of the swash plate or the inclined shaft is suppressed. Therefore, the speed ratio is appropriately controlled.

Further, the setting is made so that the capacity $Pc1$ is smaller than the maximum capacity $Pc1m$, and the capacity $Pc2$ is smaller than the maximum capacity $Pc2m$ in the predetermined speed ratio range CM, whereby insufficiency of responsiveness of the first hydraulic pump motor P1 and insufficiency of responsiveness of the second hydraulic pump motor P2 are effectively suppressed.

The setting is made so that the capacity $Pc1$ of the first hydraulic pump motor P1 functioning as the hydraulic motor reaches the maximum capacity $Pc1m$ when a vehicle body is accelerated by the power from the engine 6 in a low speed ratio range CL. The low speed ratio range CL is a range in which the wheel loader 1 requires a maximum traction force. Since the setting is made so that the capacity $Pc1$ of the first hydraulic pump motor P1 functioning as the hydraulic motor reaches the maximum capacity $Pc1m$ in the low speed ratio range CL in which the wheel loader 1 requires the maximum traction force, the wheel loader 1 can generate the maximum traction force in the low speed ratio range CL.

The setting is made so that the capacity $Pc2$ of the second hydraulic pump motor P2 functioning as the hydraulic pump reaches the maximum capacity $Pc2m$ when the vehicle body is accelerated by the power from the engine in a high speed ratio range CH. In the high speed ratio range CH, the fluctuation of the vehicle speed and the engine speed is small, and there are few aspects in which high responsiveness is required for the hydraulic pump motor. By setting the capacity $Pc2$ to the maximum capacity $Pc2m$, the power transmission device 10 can achieve a higher speed ratio, and can achieve a higher vehicle speed without rapidly increasing the engine speed.

Other Embodiments

Note that, in the above-described embodiment, the power transmission device 10 is an HMT including both the mechanical transmission mechanism 10A and the hydraulic transmission mechanism 10B. The power transmission device 10 may be an HST that includes the hydraulic transmission mechanism 10B and does not include the mechanical transmission mechanism 10A.

Note that, in the above-described embodiment, the work vehicle 1 is a wheel loader. The work vehicle 1 to which the components described in the above-described embodiment are applied is not limited to the wheel loader, and can be widely applied to the work vehicle 1 including the clutch mechanism. For example, the work vehicle 1 may be a bulldozer.

REFERENCE SIGNS LIST

1 WHEEL LOADER (WORK VEHICLE)
2 VEHICLE BODY FRAME
2F FRONT FRAME
2R REAR FRAME
3 WORKING EQUIPMENT
3A BOOM
3B BUCKET
3C LIFT CYLINDER
3D BUCKET CYLINDER
3E BELL CRANK
4 TRAVELING DEVICE
4A AXLE
4F TRAVELING WHEEL
4R TRAVELING WHEEL
4S STEERING CYLINDER
5 CAB
6 ENGINE
6A FUEL INJECTION DEVICE
7 POWER TAKE-OFF
8 WORKING EQUIPMENT PUMP
9 STEERING PUMP
10 POWER TRANSMISSION DEVICE
10A MECHANICAL TRANSMISSION MECHANISM
10B HYDRAULIC TRANSMISSION MECHANISM
11 INPUT SHAFT
12 OUTPUT SHAFT
13 HYDRAULIC OIL PIPE
14 INPUT GEAR
15 PLANETARY GEAR MECHANISM
15C CARRIER
15P PLANETARY GEAR
15R SLEEVE
15S SUN GEAR
16 PLANETARY GEAR MECHANISM
16C CARRIER
16P PLANETARY GEAR
16S SUN GEAR
17 PLANETARY GEAR MECHANISM
17P PLANETARY GEAR
17R RING GEAR
17S SUN GEAR
18 RING GEAR
19 TRANSMISSION SHAFT
20 CARRIER GEAR
22 TRANSMISSION SHAFT
23 GEAR
24 OUTER CIRCUMFERENCE GEAR
30 CLUTCH MECHANISM
31 LOW-SPEED GEAR
32 MEDIUM-SPEED GEAR
33 HIGH-SPEED GEAR
41 INPUT SHAFT ROTATION SPEED SENSOR
42 OUTPUT SHAFT ROTATION SPEED SENSOR
50 OPERATION DEVICE
51 ACCELERATOR/BRAKE OPERATION DEVICE
52 FORWARD-REVERSE OPERATION DEVICE
100 CONTROL DEVICE
101 OPERATION SIGNAL ACQUISITION UNIT
102 DETECTION SIGNAL ACQUISITION UNIT
103 TARGET OUTPUT SHAFT TORQUE DETERMINATION UNIT
104 ENGINE ACCELERATION/DECELERATION TORQUE DETERMINATION UNIT
105 OUTPUT SHAFT ROTATION SPEED PREDICTION UNIT
106 INPUT SHAFT ROTATION SPEED PREDICTION UNIT
107 SPEED RATIO CALCULATION UNIT
108 POWER CONTROL UNIT
109 CLUTCH CONTROL UNIT
110 STORAGE UNIT
111 TIMER UNIT
112 TORQUE REDUCTION COMMAND UNIT
Ca FIRST SPEED RATIO
Cb SECOND SPEED RATIO
CH HIGH SPEED RATIO RANGE
CL LOW SPEED RATIO RANGE
CM PREDETERMINED SPEED RATIO RANGE

Cv SWITCHING SPEED RATIO
Cv0 REFERENCE SWITCHING SPEED RATIO
Cv1 FIRST SWITCHING SPEED RATIO
Cv2 SECOND SWITCHING SPEED RATIO
Cv3 THIRD SWITCHING SPEED RATIO
FH FORWARD-HIGH-SPEED CLUTCH
FL FORWARD-LOW-SPEED CLUTCH
FM FORWARD-MEDIUM-SPEED CLUTCH
P1 FIRST HYDRAULIC PUMP MOTOR
P2 SECOND HYDRAULIC PUMP MOTOR
Pc1 CAPACITY
Pc1$m$ MAXIMUM CAPACITY
Pc2 CAPACITY
Pc2$m$ MAXIMUM CAPACITY
Q1 FIRST CAPACITY ADJUSTMENT DEVICE
Q2 SECOND CAPACITY ADJUSTMENT DEVICE
RL REVERSE-LOW-SPEED CLUTCH
RM REVERSE-MEDIUM-SPEED CLUTCH

The invention claimed is:

1. A work vehicle comprising:
an input shaft that is connected to an engine;
an output shaft that is connected to a traveling device;
a power transmission device that includes a hydraulic transmission mechanism including a first hydraulic pump motor and a second hydraulic pump motor and transmitting power input to the input shaft to the output shaft via a clutch mechanism, the first hydraulic pump motor functioning as one of a hydraulic pump and a hydraulic motor and the second hydraulic pump motor functioning as the other of the hydraulic pump and the hydraulic motor; and
a control device,
wherein the control device includes:
a clutch control unit that outputs a clutch command for engaging a specified clutch among a plurality of clutches of the clutch mechanism based on a speed ratio indicating a ratio between a rotation speed of the input shaft and a rotation speed of the output shaft;
a storage unit that stores correlation data indicating a relationship between the speed ratio and a capacity of the first hydraulic pump motor and a capacity of the second hydraulic pump motor; and
a power control unit that outputs a capacity command for changing at least one of the capacity of the first hydraulic pump motor and the capacity of the second hydraulic pump motor based on the speed ratio and the correlation data, and
the correlation data is set so that both the capacity of the first hydraulic pump motor and the capacity of the second hydraulic pump motor are changed with a change in the speed ratio in a predetermined speed ratio range between a first speed ratio and a second speed ratio higher than the first speed ratio.

2. The work vehicle according to claim 1, wherein the correlation data is set so that, in the predetermined speed ratio range, when one of the capacity of the first hydraulic pump motor and the capacity of the second hydraulic pump motor increases with the change in the speed ratio, the other of the capacity of the first hydraulic pump motor and the capacity of the second hydraulic pump motor decreases.

3. The work vehicle according to claim 1, wherein the predetermined speed ratio range includes a switching speed ratio at which the specified clutch to be engaged is switched.

4. The work vehicle according to claim 3, wherein the correlation data is set so that the capacity increases or decreases as the speed ratio increases from the switching speed ratio, and the capacity increases or decreases as the speed ratio decreases from the switching speed ratio.

5. The work vehicle according to claim 3, wherein in the correlation data, the capacity of the first hydraulic pump motor at the switching speed ratio is equal to or less than a maximum capacity of the first hydraulic pump motor, and the capacity of the second hydraulic pump motor at the switching speed ratio is equal to or less than a maximum capacity of the second hydraulic pump motor.

6. The work vehicle according to claim 1, wherein the correlation data is set so that a capacity of a hydraulic pump motor functioning as the hydraulic motor reaches a maximum capacity when a vehicle body is accelerated in a low speed ratio range lower than the first speed ratio.

7. The work vehicle according to claim 1, wherein the correlation data is set so that a capacity of a hydraulic pump motor functioning as the hydraulic pump reaches a maximum capacity when a vehicle body is accelerated in a high speed ratio range higher than the second speed ratio.

8. The work vehicle according to claim 1, wherein the power transmission device includes a mechanical transmission mechanism including a planetary gear mechanism and transmitting power input to the input shaft to the output shaft via the clutch mechanism.

9. A control method for a work vehicle, comprising:
calculating a speed ratio indicating a ratio between a rotation speed of an input shaft connected to an engine and a rotation speed of an output shaft connected to a traveling device;
outputting a clutch command for engaging a specified clutch among a plurality of clutches of a clutch mechanism, transmitting power input to the input shaft to the output shaft, based on the speed ratio; and
outputting a capacity command for changing at least one of a capacity of a first hydraulic pump motor and a capacity of a second hydraulic pump motor based on correlation data indicating a relationship between the speed ratio and the capacity of the first hydraulic pump motor and the capacity of the second hydraulic pump motor,
wherein the correlation data is set so that both the capacity of the first hydraulic pump motor and the capacity of the second hydraulic pump motor are changed with a change in the speed ratio in a predetermined speed ratio range between a first speed ratio and a second speed ratio higher than the first speed ratio.

* * * * *